July 16, 1929. G. L. TULLY ET AL 1,721,168
GOGGLES
Filed April 11, 1927
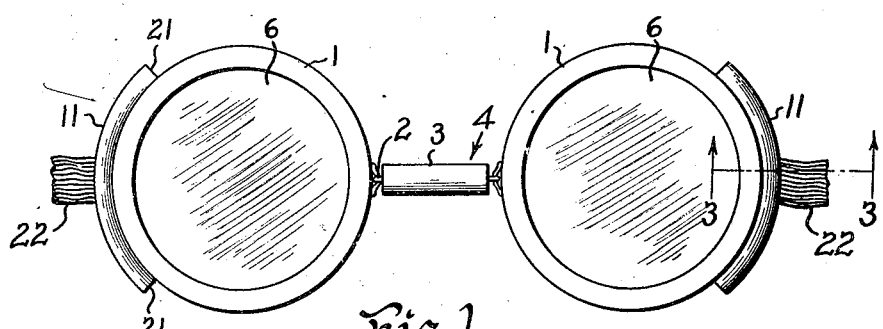
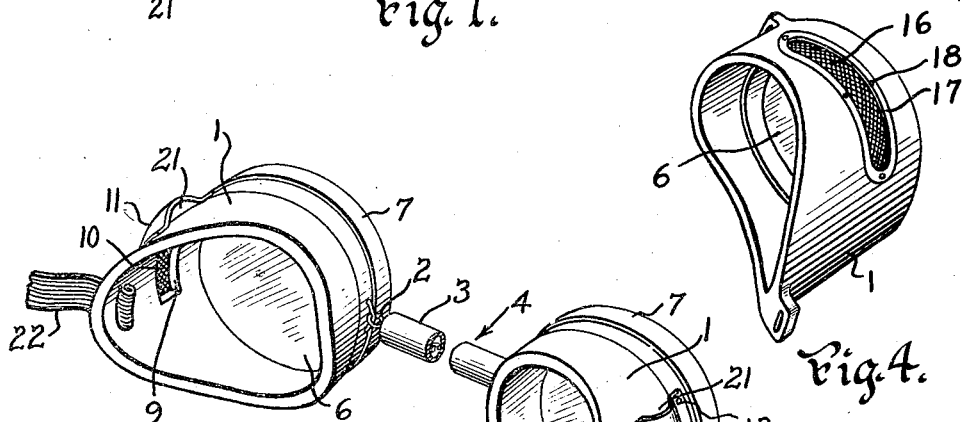
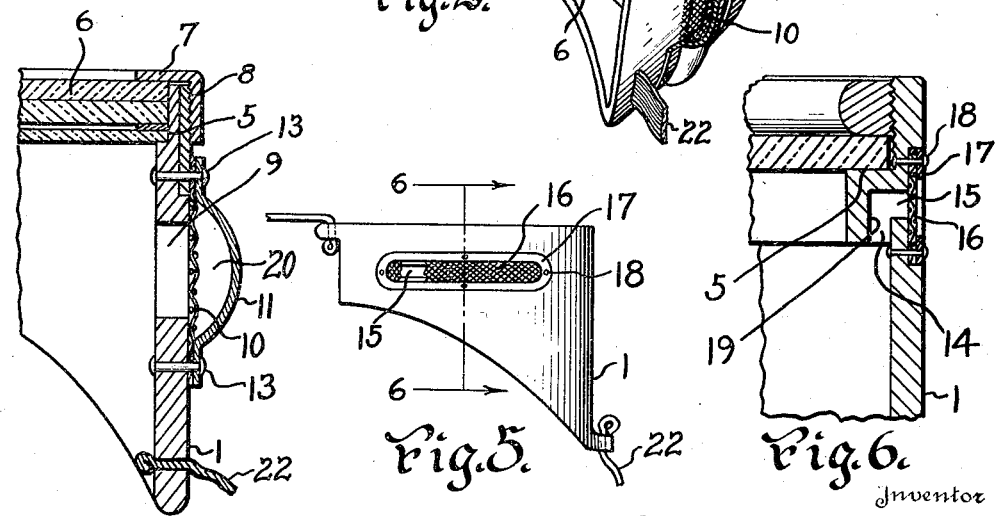
Inventor
George L. Tully.
Nelson M. Baker.
By Harry H. Styll
Attorney Patented July 16, 1929.

1,721,168

UNITED STATES PATENT OFFICE.

GEORGE L. TULLY AND NELSON M. BAKER, OF SOUTHBRIDGE, MASSACHUSETTS, ASSIGNORS TO AMERICAN OPTICAL COMPANY, OF SOUTHBRIDGE, MASSACHUSETTS, A VOLUNTARY ASSOCIATION OF MASSACHUSETTS.

GOGGLES.

Application filed April 11, 1927. Serial No. 182,732.

This invention relates to goggles and has particular reference to ventilating openings employed in connection with means for baffling the admission of light and foreign matter therethrough.

The principal object of this invention is to provide goggles having ventilating openings that are shielded so that no injurious light or foreign matter such as molten metal, glass, hot flakes and so forth, may reach the eyes of the wearer.

Another object is to provide a very simple, neat and economical construction for such purpose.

Other objects and advantages will be apparent by reference to the following specification taken in connection with the accompanying drawings, and it will be understood that we may make many modifications in the specific details of construction shown and described within the scope of the appended claims without departing from or exceeding the spirit of the invention, the preferred forms only have been shown and described by way of illustration.

Referring to the drawings:

Fig. 1 is a front elevation of a goggle embodying the invention.

Fig. 2 is a rear perspective view showing a portion of the side shield cut away to show the screen and ventilating opening.

Fig. 3 is a section on line 3—3 of Figure 1.

Fig. 4 is a perspective view showing a modification of the goggle.

Fig. 5 is a top or plan view of the eye cup shown in Fig. 4.

Fig. 6 is a section on line 6—6 of Figure 5.

These goggles are designed for welders, molten glass workers, foundry men and so forth, who are exposed to intense heat and light and who must protect their eyes from foreign matter such as hot metal chips or sparks, flakes of glass, molten metal, etc., and also protect their eyes from the intense glare of light such as from a welder's torch or white hot metal.

In forming goggles of this character, wherein the wearer is subject to perspiration, it is very essential to provide ventilating means that will prevent the lenses held within the goggles from becoming steamed and blurred so as to affect the vision of the wearer. Although ventilating openings are very essential they have been found in the past to be the cause of blindness in many cases through the entrance of splashing molten metal and other foreign matter such as hot sparks or flakes which have been known to pass these openings and thereby gain admission to the eyes of the wearer.

The present invention is therefore designed to provide ventilating means together with means for eliminating all possibility of light or foreign matter reaching the eyes of the wearer.

Referring more particularly to the drawings in which similar reference characters denote similar parts throughout, the invention consists of a goggle formed of the eye cups 1 connected at the center by the chain or the like 2 covered with the rubber tubing 3 to form the bridge or nose contacting member 4. The eye cups 1 are formed with the inner annular lens receiving shoulders 5 upon which the lenses 6 are seated and are held therein by the lens retaining rings 7 threadedly connected as at 8 to the outer or inner walls of the eye cups as shown in Figures 3 and 6.

In Figures 2 and 3 the eye cups 1 are formed with the ventilating openings 9 covered with the wire mesh or screens 10 over which the baffle plates or shields 11 are placed to prevent the entrance of foreign matter or light within the goggle. The baffle plates or shields 11 are attached to the eye cups by the rivets or the like 13 which are also used to hold the wire mesh or screens 10 in position over the openings 9. By reference to Figures 1 and 2 it will be seen that the baffle plates or shields 11 are arcuate in form to conform to the curvature of the eye cups to which they are attached and are arched in the center to form the chambers 20 which terminate with the openings 21 at each end to allow free circulation of air through the screened openings 9 so that the eye cups may be well ventilated. These baffle plates or shields 11 used in conjunction with the screens 10 prevent entrance of light or foreign matter within the eye cups as aforementioned. The eye cups 1 may be formed of fiber or any suitable material not subject to absorption of heat.

Referring more particularly to Figures 4, 5 and 6 in which is shown a modification of the invention, the shouldered portions 5 upon which the lenses 6 are seated are formed on the base with the slots 14 communicating with the slots 15 which are positioned substantially at right angles to the slots 14. The slots 15 are covered with the wire mesh or screens 16 held in position on the eye cups by the frame members 17 and rivets 18.

By reference to Fig. 6 it will be seen that the side walls of the eye cups 1 are shouldered as at 23 to receive the wire mesh or screens 16 and frame members 17 so that they may be positioned flush with the side walls of the eye cups to form a very neat and attractive appearing goggle.

In this instance it will be noted that the openings 15 are protected by the wire mesh or screens 16 and side walls 19 of the slots 14 which act as a shield for the openings 15 so that no light or foreign matter may gain admission to the eyes of the wearer.

The goggle may be held upon the face of the wearer by the elastic head band or the like 22.

From the foregoing it will be seen that we have provided simple, economical and effective means for baffling the admission of foreign matter or light to the eyes of the wearer and have provided means whereby the goggle may be effectively and continually ventilated.

Having described our invention, we claim:

1. In a device of the character described, an eye cup having a ventilation opening transversely therethrough and a sunken seat surrounding the opening and a vented screen secured in the sunken seat and over the opening so that the outer face of the screen will not project beyond the face surface of the eye cup.

2. In a device of the character described, an eye cup having a ventilation opening transversely therethrough and a sunken seat surrounding the opening, a vented screen in the sunken seat and over the opening, and a securing band fastened over the screen around the periphery of the sunken seat, the outer face of which does not project beyond the face surface of the eye cup.

GEORGE L. TULLY.
NELSON M. BAKER.